July 15, 1958 W. KAFKA ET AL 2,843,763
APPARATUS FOR THE SWITCHING OF ELECTRIC
POWER CIRCUITS WITHOUT CONTACTS
Filed March 3, 1955 6 Sheets-Sheet 5

July 15, 1958   W. KAFKA ET AL   2,843,763
APPARATUS FOR THE SWITCHING OF ELECTRIC
POWER CIRCUITS WITHOUT CONTACTS
Filed March 3, 1955   6 Sheets-Sheet 6

United States Patent Office 2,843,763
Patented July 15, 1958

2,843,763

APPARATUS FOR THE SWITCHING OF ELECTRIC POWER CIRCUITS WITHOUT CONTACTS

Wilhelm Kafka, Georg Sichling, and Manfred Tschermak, Erlangen, Germany, assignors to Siemens-Schuckertwerke Aktiengesellschaft, Berlin-Siemensstadt and Erlangen, Germany, a corporation of Germany Application March 3, 1955, Serial No. 491,983

Claims priority, application Germany March 4, 1954

29 Claims. (Cl. 307—88)

Our invention relates to apparatus for the switching of electric power circuits without contacts. The word "switching" is used herein with a meaning similar to that applying, for instance, to mechanical circuit breakers and denoting an abrupt change in resistance at the switching location from maximum to minimum during make operation or, conversely from minimum to maximum during break operation.

It has become known to use transistors for the switching of feeble electric currents as occurring in communication circuits. The currents thus controllable are in the order of milliamps, and the power capacity is at most a few watts. Aside from transistors, other controllable semiconductors have recently become known whose resistance can be varied within a wide range by varying a control magnitude. Among these, above all, are the magnetically controllable semiconductors of high carrier mobility, particularly semiconductors of at least 6000 cm.$^2$/volt second mobility, and also semiconductors of the magnetic barrier-layer type. Well suitable as magnetically controllable semiconductors of high carrier mobility are those consisting of a binary compound of one of the elements boron, aluminum, gallium, indium in the third group of the periodic system with one of the elements nitrogen, phosphorus, arsenic, antimony in the fifth periodic group. Semiconductors of this type, having a resistance controllable by the variation of an applied magnetic field, are described in the copending applications Serial No. 275,785, filed March 10, 1952, and Serial No. 391,647, filed November 12, 1953, both assigned to the assignee of the present invention. Semiconductors with a magnetic barrier layer, of which preferably intrinsically conducting and surface-treated germanium is applicable, are likewise distinct by a relatively low electric resistance which, by applying a magnetic field of a certain direction and of sufficient strength, can be increased to a very high value in one direction of current conductance. The high asymmetrical resistance of these semiconductors can be wholly or partially eliminated by an additionally applied electric field or by radiation of a given direction. Semiconducting resistors exhibiting the magnetic barrier-layer effect are described in the copending applications Serial No. 297,788, filed July 8, 1952, now Patent No. 2,736,658, Serial No. 462,516, filed October 15, 1954; and Serial No. 495,007, filed March 17, 1955, all assigned to the assignee of the present invention. The latter two applications disclose proposals to use such semiconductors for switching operation in electric circuits.

The advantages of switching electric circuits by means of controllable semiconducting resistors lie mainly in the fact that a completely static circuit member, simpler than electronic tubes, affords a contact-free make and break operation in a relatively simple manner so that arcing and the various other difficulties arising with mechanical switch contacts are obviated. It would be desirable if such contact-free switching members could also be applied for the control of larger power quantities. However, if an attempt is made at increasing the dimensions of the known controllable semiconducting resistors and using them in power circuits, that is, in circuits of about 10 watts and more, preferably from about 100 watts upward, it becomes at once apparent that such semiconductors fail completely or encounter severe difficulties.

It is an object of our invention to afford the use of controllable semiconductors for the switching of much larger power and current magnitudes than heretofore applicable so as to utilize their outstanding advantages for the purposes of utility-current and general power control.

The present invention attains this object on the basis of the recognition that the failure of controllable semiconductors to operate as switching devices for highpower control is due to the energy losses that occur in the semiconductor material during the transition interval within which the semiconductor changes from maximum resistance and minimum current to minimum resistance and maximum current or vice versa, and that the detrimental effect of these transistory energy losses increases with the larger size of the semiconducting resistor needed for the control of larger power quantities.

It is essential for a semiconducting resistor that a certain peak temperature is not exceeded at any spot of the semiconductor. Especially prominent is this effect of transition losses with semiconducting resistors in which either the main portion of the losses is concentrated at singular localities as is the case, for instance, with transistors, or with semiconducting resistors of the magnetic barrier-layer type wherein the generation of waste energy is crowded at certain spots of the semiconductor during the barrier period or during the transition interval. In such cases the waste heat is generated within a very small volume and cannot dissipate itself sufficiently fast during the available short interval of time.

For these reasons and in accordance with one of the features of our invention we provide a power circuit with a switching member consisting of a controllable semiconducting resistor whose ratio of its two limit resistances is at least 10 to 1, in combination with means which reduce the waste energy of the semiconducting resistor during the transition interval from maximum to minimum current (break operation) and/or vice versa (make operation).

Particularly well suited for the switching of power circuits, according to the invention, are semiconducting resistors of the above-described barrier type because they have not only a large ratio between the two obtainable limit resistances but can also be rated for particularly slight residual resistance values and large current magnitudes. Compared with transistors, the magnetic-barrier semiconductors have the further advantage that the waste energy generated during the transition interval is distributed over a larger volumetric proportion of the resistor body. Also suitable for the purposes of the invention, are magnetically controllable semiconducting resistors in general, provided those chosen have a sufficiently high carrier mobility, preferably a carrier mobility of at least about 10,000 cm.$^2$/volt second. In such semiconductors the waste energy distributes itself throughout the entire volume of the semiconductor. However, the invention also permits the application of transistors, for much higher power requirements than heretofore amenable to such devices.

The foregoing and other objects, advantages and features of the invention will be apparent from, and will be described in, the following with reference to the accompanying drawings.

For minimizing the waste energy in the transition interval of a semiconductor device according to the invention, two phenomena are to be considered, namely the duration of the resistance variation and the rate of the current change caused by the resistance variation. Accordingly, the means applied according to the invention for reducing the waste energy during the transition interval may be grouped into those for shortening the transition interval and those for obtaining a delayed rise in current when closing the power circuit, or an accelerated current decay when opening the circuit.

Means of the latter type will be dealt with first. For this purpose reference is made to the time curves shown in Figs. 1 to 3 in which curve $r$ denotes the semiconductor resistance, $i$ the current following through the resistor, $i^2r$ the waste energy in the semiconductor resistance, and $c$ the temperature at the hottest spot of the semiconductor. The curves are based on the simplified assumption that during the transition period $T_u$ the resistance $r$ changes approximately in accordance with a parabola.

Figure 1:
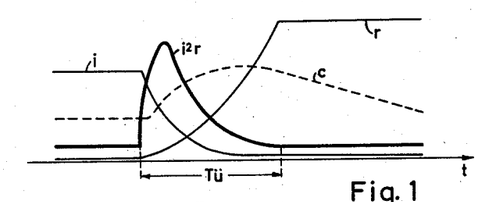
Figs. 1 to 3 are coordinate diagrams explanatory of the invention.

The conditions represented in Fig. 1 relate to a purely ohmic load resistance. The load current $i$ decays in accordance with the increase in resistance variation the losses are relatively small and constant. During the resistance variation they increase approximately parabolically to a peak value which is a multiple of the continuous losses during the make period, i. e. the time of minimum semiconductor resistance, and which is also a multiple of the continuous losses during the break period, i. e. the time of maximum semiconductor resistance. The waste energy generated during the transition interval $T_u$ corresponds to the cross-hatched area. The increase of temperature $c$ to a peak value corresponds to that area, the peak value being reached near the end of the transition period $T_u$. Thereafter the temperature decays to a constant value due to dissipation of the waste heat.

Figure 2:
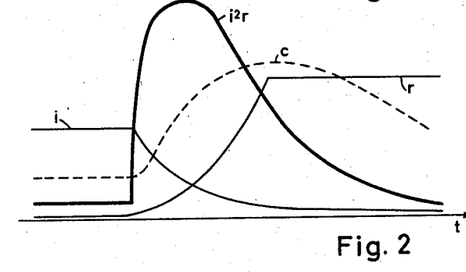

Fig. 2 shows the analogous conditions obtain when opening an inductive load circuit. In this case, current $i$, commencing with the interval $T_u$, decays more slowly than in Fig. 1 and reaches the steady-state value some time after termination of interval $T_u$. Since the semiconductor resistance $r$ rises faster than the current $i$ decays, the losses $i^2r$ increase during the transition interval $T_u$ and last longer than the transition interval. As a result the temperature $c$ assumes a higher peak value than with the ohmic load according to Fig. 1.

Figure 3:
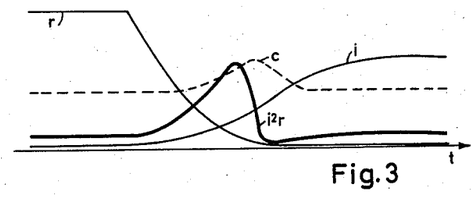

Fig. 3 shows the case of closing a power circuit with an inductive load. The current rise is slower than the decline of the semiconductor resistance. Hence, the transition losses and the peak temperature are lower than in Fig. 2 and also lower than in Fig. 1. With high inductive loads these transitional values may even be smaller than those of the steady-state condition.

When switching a power circuit which includes capacitances or counter voltages, the behavior is the reverse of that exemplified by Figs. 2 and 3. This is because the opening of a circuit involves lower transition losses than the closing, as will be recognized from analogous considerations. In other words, the most favorable conditions as regards transition losses obtain when closing an inductive circuit and when opening a capacitive circuit.

For this reason, and according to another feature of our invention, the load circuit to be switched by means of controllable semiconducting resistors is supplemented by static circuit members such as reactor coils, capacitors or valves, so that it behaves like an inductive resistance during make operation and like a capacitive resistance during break operation.

Embodiments of the invention, showing how such additional circuit members in the load circuit to be controlled most favorably modify the transition losses, will be described presently with reference to Fig. 4a to Fig. 4h.

Figures 4A, 4B, 4C:
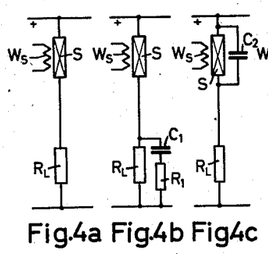
Figs. 4a to 4h show schematically a number of different circuit diagrams of apparatus according to the invention.

Fig. 4a shows a direct-current circuit with an ohmic load $R_L$ to be switched on or off by a controllable semiconductor resistor S. The control means for the semiconductor are schematically represented by a winding $W_S$. The resistor S may consist, for instance, of a magnetically controllable semiconductor whose control field is produced by the field winding $W_S$. Semiconductor devices applicable for this purpose will be more fully described in a later place. For instance, the device described below with reference to Figs. 5 to 13 may be used in any of the circuits shown in Figs. 4a to 4h. When the semiconducting switching device in Fig. 4a breaks the load circuit, the phenomenon exemplified by Fig. 1 will occur. As explained, however, the transition losses during break operation can be reduced according to the invention if the load circuit is given a capacitive characteristic.

For this purpose, as shown in Fig. 4b, a capacitor $C_1$ is connected parallel to the load $R_L$, preferably in series with a damping resistor $R_1$. A similar possibility of the same effect is to connect according to Fig. 4c a capacitor $C_2$ parallel to the controllable semiconducting resistor S.

As apparent from the foregoing explanations relating to Figs. 2 and 3, the transition losses in capacitive load circuits are larger during make operation. Hence embodiments according to Figs. 4b and 4c are mainly suitable for performing break operations.

Figures 4D, 4E, 4F, 4G:
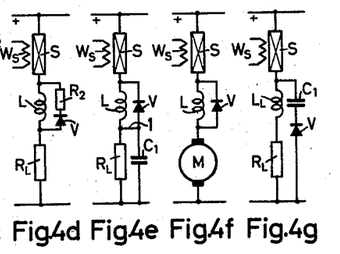

If the closing of an ohmic load circuit is to be facilitated, then according to Fig. 4d, an inductivity L is connected in series with the ohmic load $R_L$ so that the transition losses according to Fig. 3 are lower than those occurring under the conditions of Fig. 1. To prevent increased losses during break operation according to Fig. 2, an electric valve (asymmetrical condutor) V, for instance a dry-type rectifier, is connected parallel to the inductivity L, if desired in series with a damping resistor $R_2$. The valve V is poled to block the parallel path during the closed period of the switching device and thus short-circuits the inductivity L at the opening moment. The larger transition losses will then occur during break operation according to Fig. 1.

The advantages of the circuits according to Figs. 4b and 4c on the one hand, and of Fig. 4d on the other hand can be combined for reducing the transition losses during break operation as well as during make operation. To this end, according to Fig. 4e, an inductivity L is inserted into the circuit of the ohmic load $R_L$, an electric valve V is connected parallel to the inductivity L, and a capacitance $C_1$ is connected parallel to the load. In analogy to Figs. 4b and 4d, a damping resistor (not shown in Fig. 4e) may additionally be connected in series with the valve and/or with the capacitor $C_1$. Then the inductivity according to Fig. 4d (Fig. 3) acts in the loss-reducing sense during make operation and the same effect is produced by the capacitance $C_1$ during break operation.

Fig. 4f shows a motor circuit in which the make and break operations are more favorable than in the case of Fig. 1, because the inductivity L with the parallel connected valve V facilitates the make operation, and the counter E. M. F. of the motor produces conditions similar to those obtained by the capacitance $C_1$ in Fig. 4b or 4e.

In a circuit with a mixed ohmic and inductive load, represented in Fig. 4g by the resistance $R_L$, and the inductivity $L_L$, a reduction in transition losses during make and break operations can likewise be obtained. The circuit of a capacitance $C_1$ and a series-connected valve V, such as a rectifier, is connected parallel to the mixed ohmic and inductive load $R_L$, $L_L$. The valve V in Fig. 4g has the same poling as in Fig. 4e so that a charging current can flow to the capacitance $C_1$ only during break operation. It is preferable to use as the valve V a rectifier or generally an asymmetrically conducing device which permits the flow of a relatively large inverse current so that the capacitor charge can dissipate during steady-state operating conditions. Instead, a resistor may be connected parallel to rectifier V. When making the circuit, the capacitor $C_1$ cannot absorb current because of the blocking action of the rectifier. The inductivity $L_L$, permits only a gradual rise of the current so that during the transition interval $T_u$ only slight losses occur in the semiconductor as exemplified in Fig. 3. In the closed condition of the circuit, the capacitor is charged by the inverse current flowing through the rectifier V or due to the current flowing through the resistor that may be connected parallel to the rectifier. During break operation, that is at the beginning of the resistance increase in semiconductor S, the slight voltage initially obtaining across the semiconductor S persists for a short interval of time due to the fact that the charging voltage of the capacitor $C_1$ lies across the combined resistance $L_L$, $R_L$ so that at first the division of voltage in the total circuit remains the same. Consequently, the current through the semiconductor decreases at the first moment of the break operation in inverse proportion to the increase in semiconductor resistance. As a result, the losses do not rise in accordance with Fig. 1 but may even at first decline below the steady-state losses previously obtaining. It will be recognized that the capacitor $C_1$ is preferably made large enough to retain a sufficiently high voltage during the transition interval $T_u$.

In cases where the inductivity $L_L$ of the load circuit is too small for sufficiently suppressing the transition losses during make operation, an additional inductivity may be connected in series.

It follows from the foregoing explanation of Fig. 4g that when switching an ohmic load circuit and facilitating the make operation by a series inductivity L according to Fig. 4e, the bridge connection 1 shown in Fig. 4e may be omitted. The functioning is then the same as in the circuit according to Fig. 4g.

Depending upon the particular conditions and requirements, the examples of circuit components disposed in the load circuit according to Figs. 4a to 4g for reducing the transition losses, may be modified in various ways. For instance, according to one of the available modifications, capacitors with series connected valves are arranged in parallel relation to the semi-conducting switching members. Furthermore, circuits may be used in which reactor coils and capacitors are connected in series so that, during switching, predetermined oscillations occur whose first half wave is utilized during the transition interval $T_u$ in the advantageous sense explained in the foregoing. Instead of ordinary reactor coils as indicated at L in Figs. 4d, 4e, 4f, reactors without air gap may be used which become saturated at a predetermined instantaneous current intensity. In other words, the saturable inductors known as commutation reactors for mechanical contact rectifiers are favorably applicable for the purposes of the present invention. These reactors are then to be rated so that their voltage-time integral during the transition interval $T_u$ secures a weak-current step or pause in which the current is suppressed to zero or a desired residual value. A saturable reactor thus used is shown at $L_S$ in Fig. 4h described presently.

While the foregoing description of Figs. 4a to 4g relates to the switching of direct-current circuits, the same features are also applicable in alternating-current circuits. In the latter case, the conducting direction of the above-described valve devices V must reverse with the reversal of the driving voltage. Suitable as such valves, for instance, are semiconducting resistors with a magnetic barrier layer whose controlling field is reversed with reversal of the driving voltage. However, other resistance devices of asymmetrical conductance that can be reversingly controlled by variation within the associated circuits or by variation of the controlling magnets, can be used for the same purpose provided they operate entirely free of mechanical contacts.

Figure 4H:
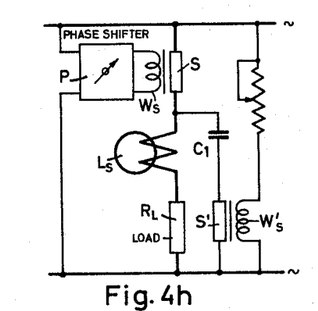

An embodiment of an alternating-current circuit equipped with such a valve device of periodically reversing polarity is shown in Fig. 4h. The load circuit $R_L$, $L_S$, and the parallel path $C_1$, V correspond to Fig. 4g, except that the device V consists of a magnetic barrier semiconductor S' whose control magnet reverses its polarity under control by an excitation winding $W'_S$ which is connected to the alternating-current line feeding the load. The semiconductor switching device in the load circuit changes its resistance between the limit values under control by a magnet winding $W_S$ whose excitation is also taken from the alternating-current line through a controllable phase shifter P for controlling the make and break moments as explained below. The design of the reversible rectifier or valve device S' in Fig. 4h may be essentially the same as that of the magnetic barrier device described below with reference to Fig. 5.

It is apparent from the foregoing that a reduction in transition losses by change of the resistance characteristic of the load circuit shortly prior to, and/or during the transition interval is obtainable with simple and completely static circuit components. Such a change in resistance characteristic of the load circuit can also be obtained by additional switching means, for instance, by the time-controlled insertion and/or disconnection of series or parallel resistors at any location of the load circuit. Such additional switching can likewise be effected by controllable semiconductor devices which preferably are connected with, and controlled by, the same semiconductor devices whose operation the additional devices are to facilitate.

According to another feature of the invention, the reduction of the losses during the transition interval is effected, in addition to or instead of the above described circuit components in the load circuit, by properly selecting the time points of the switching operations when periodically making and breaking an alternating current circuit. For instance, assuming that a capacitive load circuit is to be closed and opened once during each period or during each half wave, then it is preferable to close the circuit at the voltage zero passage or in its vicinity because the transition losses are slight in any event. The opening moment can be placed at any desired instant of the half wave because then the transition losses even with high voltages are slight because of the loss reducing effect of the capacitance during that interval. In this manner, a controllable part-time conductance during each half wave period is obtained similar to the commutation delay method conventionally used for controlling the voltage of an alternating-current by the periodic switching of a grid controlled gaseous or vaporous discharge device, except that with discharge devices the closing moment occurs at any desired time point of the half wave and hence at a high instantaneous voltage, while the opening moment always substantially coincides with the current zero passage.

The adjustable phase shifter shown at P in Fig. 4h serves the just-mentioned purpose of shifting the make and break moments for controlling or regulating the current supplied through semiconductor members to the load $R_L$.

Before dealing with further features and applications of the invention, an example of a semiconductor switching device as shown at S, $W_S$ in Figs. 4a to 4h will be described in detail with reference to Fig. 5.

Figure 5:
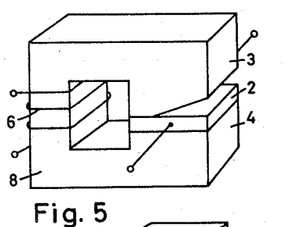
Fig. 5 is a schematic and perspective view of a semiconductor switching device applicable to any of the circuits shown in Figs. 4a to 4g and in subsequent illustrations.
Figure 10:
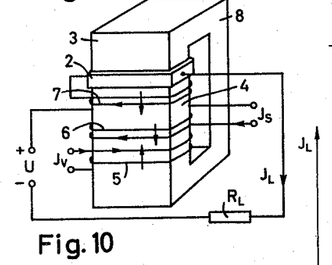
Figs. 10 and 12 show switching circuits with a device involving a feedback control for triggering a flip-flop resistance characteristic in accordance with explanatory diagrams illustrated in Figs. 11, 13 and 14.
Figure 12:
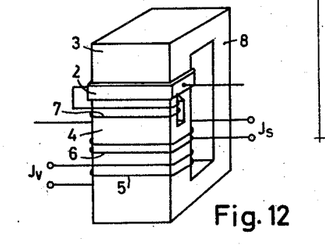

According to Fig. 5, a semiconductor member 2 (corresponding to S in Figs. 4a to 4h) is located in the field between the pole shoes 3, 4 of a magnet 8 controllably excited by a winding 6 (corresponding to $W_S$ in Figs. 4a to 4h). The pole faces are electrically insulated from the semiconductor member either by insulating coatings or by making the pole-face zones of ferrite material which, though magnetic, is electrically insulating. The pole faces may both be planar and may both be fully in face-to-face proximity to the adjacent semiconductor surfaces (see Fig. 10), but in Fig. 5 the pole shoe 3 is shown to have its pole face partly slanted away from the semiconductor for locally concentrating the magnetic field as explained in a later place. This particular design and field concentration is to be used only if the semiconductor is of the magnetic barrier type, while straight or planar pole faces (as shown in Figs. 10, 12) are preferable if the semiconductor member is conductive in both directions of current flow. In either case, however, the resistance of the semiconductor varies in dependence upon the strength of the magnetic field component perpendicular to the current-flow direction in the semiconductor. A resistance variation of a ratio above 10:1 or even in the order of 100:1 and more can thus be obtained if, with a symmetrically conducting semiconductor, the semiconductor material has a sufficiently high carrier mobility or if the magnetic barrier effect is utilized. For securing high carrier mobility the semiconductor may consist of indium arsenide or indium antimonide both affording a carrier mobility above 20,000 cm.²/volt second.

As mentioned, the particular slanted-pole design shown in Fig. 5 is especially suitable for magnetic barrier devices. In such devices the semiconductor may consist of material of lower carrier mobility, preferably germanium, although the high-mobility materials just-mentioned as well as other semiconducting compounds, including those introductorily mentioned in this specification, are also applicable. For securing the magnetically controllable valve or rectifying effect, the semiconductor member is so prepared as to have a surface of high surface recombination opposed to a surface or portion of low surface recombination. This is done either by applying a surface treatment (see the above-mentioned copending application Serial No. 297,788) and/or by giving the semiconductor body a particular shape as disclosed in the above-mentioned copending application Serial No. 495,007. For instance, relating to Fig. 5, the following design is applicable.

One of the vertical surfaces of the semiconductor crystal extending parallel to the current-flow direction is given high surface recombination by grinding and polishing that surface to mirror finish. The other vertical surface parallel to the current flow is given low surface recombination by etching. This is done, for instance, by anodically treating the surface in an electrolytic bath. Suitable as such a bath in the case of germanium is diluted caustic soda with some addition of hydrogen peroxide.

In such a semiconductor member, the electron-hole pairs become crowded near the surface of high recombination so that a carrier-depleted zone, i. e. the magnetic barrier layer, is formed in the zone of low recombination. This effect has the result that the semiconductor has high resistance to current flow in one direction and low resistance in the other direction, depending upon the polarity of the applied magnetic field. Hence, the rectifying action can be reversed by reversing the magnetic field polarity. This barrier effect is increased by giving the high-recombination surface a larger area than the low-recombination surface or reducing the latter surface to zero as described in the above-mentioned application Serial No. 495,007; but this need not herein be further described because the particular design of the magnetic-barrier device is not essential to the present invention proper.

The semiconductor member is dimensioned in accordance with the required resistance and power values. For instance, it may be given a resistance range of about 1 to 100 ohms, or 10 to 1000 ohms. For controlling high power values, it may be necessary to subdivide the member into a member of individual crystal and to provide them with fins (2c in Fig. 31) or other cooling means as more fully described in a later place.

It has been tacitly assumed in the foregoing that the transition interval is always the same. The circuit components added to the load circuit according to Figs. 4a to 4h for reducing the transition losses become larger with increasing length of the transition interval $T_u$. It is therefore important to keep the transition interval $T_u$ as short as possible.

According to one way of doing this, the semiconductor-controlling change in control magnitude itself is accelerated so as to pass the semiconductor resistance from one to the other limit value within a time as close as possible to the theoretically attainable minimum value. The control magnitude whose change is thus to be accelerated, is the magnetic and/or electric field strength and/or the radiation field acting upon a magnetic barrier semiconductor; or it is the magnetic field strength acting upon a symmetrically conducting semiconductor of high carrier mobility; or the emitter current of a transistor. Generally, therefore, one way of accelerating the change in semiconductor resistance is to provide the semiconductor device with control means that are inherently capable of the desired rapid action.

Another possibility according to the invention is to have the control means as such change only part of the semiconductor resistance, while the residual change in resistance is produced or aided by a feedback coupling responsive to a condition of the load circuit that in turn depends upon the resistance change of the semiconductor. Such a feedback coupling is responsive to the load current, the semiconductor current, the load voltage, the semiconductor voltage, or to several of these magnitudes; and these feedback magnitudes may either act upon one and the same control magnitude (for instance, the magnetic field strength) or upon respectively different control magnitudes (for instance, the magnetic strength and the electric field strength). It is particularly favorably to have the feedback coupling act upon a control magnitude of slight inherent inertia, for instance upon the electric field strength.

When using semiconducting resistors with control means that vary the magnetic field strength acting upon the semiconductor, it is necessary to provide devices, such as a magnet system, for producing and rapidly changing the magnetic flux. The change in magnetic flux can be effected either by varying the magnetic resistance of the magnetic circuit for instance by means of a variable air gap, or by a variable magnetomotive force, for instance a variable excitation current, or by applying both means simultaneously or in a predetermined succession. A rapid variation of the magnetic flux, for instance, can be obtained by applying the known principle of a blocking magnet (saturable magnet) in which a strong over-excitation can be applied without compelling the magnetic flux to exceed given values. The distribution of the magnetic field strength over the three space coordinates of the semiconductor need not be homogenous. On the contrary, it is of advantage to increase the field strength to the maximum value where this is necessary for attaining the resistance limit values required for the switching operation, and to apply a lower field strength at other locations. As a result, the total magnetic flux and hence the magnetic energy demands can be reduced so that a smaller exterior inertia will result. For instance, with semiconductors of the magnetic barrier type, it is in some cases of advantage to increase in the vicinity of the surface of supply electron-hole pair recombination the magnetic field strength or the electric field strength or simultaneously both field strengths. The embodiment illustrated in Fig. 5, and described above, is of the latter type. For obtaining an inhomogeneous field strength in the semiconductor 2, the face of pole shoe 3 is, in part, slanted away from the semiconductor member 2 and the pole extends close to the semiconductor 2 along the zone of the magnetic barrier layer to obtain high magnetic field strength at that location.

According to a modification, the electric or magnetic field distribution in the semiconductor is varied during the transition interval. The magnetic field distribution versus time can be varied, for instance, by providing the magnet system with two or more exterior magnetic short circuits or shunts. These shunts are provided with respective separate excitation windings which are excited at different times, for instance, by having the load-current responsive feedback coupling act upon only one of the excitation windings. The change in magnetic field strength distribution versus time during the transition interval can also be imposed upon the magnetic field of the electric load current flowing through the semiconductor. An embodiment of this type is illustrated in Figs. 6 and 7.

Figure 6:
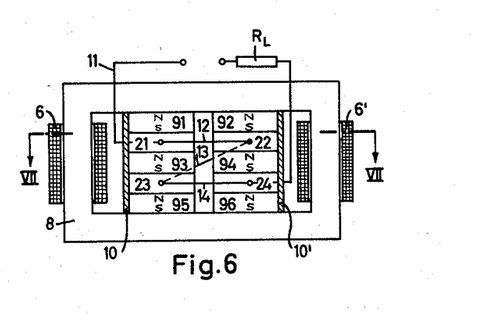
Figs. 6, 7 show schematically a front view and section of another switching device also suitable for use in the various circuits, the section being taken along the line VII—VII in Fig. 6.
Figure 7:
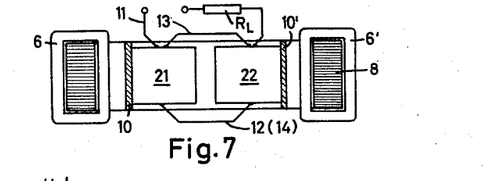

The switching device of Figs. 6 and 7 comprises a magnetizable and preferably laminated core structure. The lateral limbs of the core structure are provided with excitation windings 6, 6'. Located within the frame formed by the core structure 8 are four magnetic barrier semiconductors 21 to 24. The semiconductors are electrically connected with each other in such a manner as to form a winding together with their connecting leads. The semiconductors 21 to 29 are stacked together with permanent magnets 91 to 96, all having the same field orientation as is indicated by the polarity designation N and S. The permanent magnets 91 to 96 are either insulated by thin coatings from the semiconductors or they consist of ferrite material which is electrically insulating. In the latter case the permanent magnets may directly contact the semiconductor crystals. The device inherently provides a feedback coupling which causes the resistance of the individual semiconductors to decline with an increase in load current.

For this purpose, one end of the semiconductor 21 is connected with the load circuit by a lead 11. The other end of the same semiconductor is connected through a lead 12 with one end of the semiconductor 22. The other end of semiconductor 22 is connected by a lead 13 with the semiconductor 23, which in turn is connected through a lead 14 with the semiconductor 24. The other end of the semiconductor 24 is connected through the load resistance $R_L$ with the other pole of the voltage source. The semiconductors 21 to 24 thus form together with the connecting leads 12 to 14 two windings and thereby produce a magnetic field whose direction depends upon the direction of current flow. In order to have this field act as a feedback coupling upon the semiconductors so as to reduce their resistance with increasing current, an exterior field must be opposingly imposed upon the inherent field of the semiconductor arrangement. This exterior field is produced by the permanent magnets 91 to 96. When the electric winding 6 causes an increase in the load current passing through the semiconductors 21 to 24, the resultant field of the semiconductor arrangement is weakened. The weakening effect is largest at those edges of the semiconductors 21 to 24 that face each other, and these locations may even show a reversal in resultant field direction.

Before describing further devices applicable according to the invention for accelerating the control of the magnetic barrier semiconductors, the relation between semiconductor resistance, electric and magnetic field strength, or between current and voltage of the semiconductor will first be generally explained.

Figure 8:
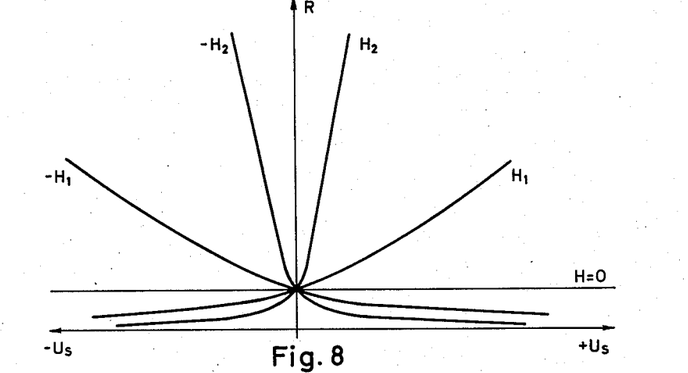
Figs. 8 and 9 are explanatory diagrams relating to such devices.

Fig. 8 shows in principle the variation of the semiconductor resistance R in dependence upon the voltage $U_s$ across the semiconductor by parameter curves corresponding to the magnetic field strength values $H=0$, $H_1$, $H_2$ and the reversingly directed field strength values $-H_2$ and $-H_1$. For the magnetic field strength $H=0$, the resistance R is constant independently of the polarity and magnitude of the voltage. With a given finite field strength, for instance $H_1$, the resistance R for positive voltages $U_s$ is larger than the resistance for $H=0$. With a negative voltage, however, the resistance is smaller. For the reverse field direction, the conditions are reversed also with respect to the voltage. Consequently, such a resistor can be controlled to exhibit a barrier effect in either direction and to conduct in either direction, depending upon the direction of the magnetic field strength relative to the electric field strength. In this respect, such a resistor differs fundamentally from the conventional or "genuine" rectifying component whose blocking direction is geometrically determined and hence fixed.

Figure 9:
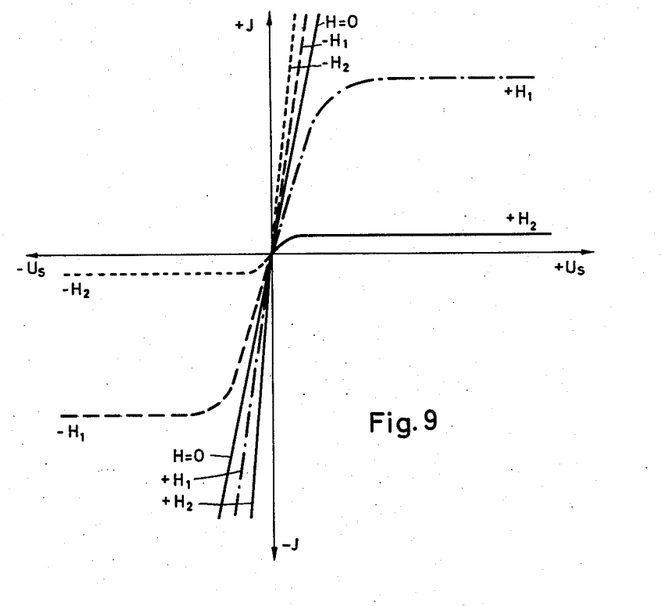

Fig. 9 illustrates the relation between semiconductor current and semiconductor voltage, the magnetic field strength being again used as a parameter. At the field strength $H=0$, the current increases linearly with the voltage in both directions. With a given finite field strength, for instance $+H_1$, the increase in current slows down above a given voltage and then ceases entirely. Thus the current merges into a horizontal line in accordance with a saturation characteristic. That is, by applying the magnetic field strength $+H_1$ the current in the positive direction is limited to a given value. We call this blocking direction the "inverse" direction. With a reversed voltage, the current increases about proportionately with the voltage in the reverse direction as before but is not limited in this "forward" direction. The current rise now is even more stable than with the field strength $H=0$. For the reverse field direction, the inverse direction is also reversed as will be seen from a study of the third quadrant. The illustration also shows that when increasing the field strength the maximum current in the inverse direction is reduced. Generally, therefore, the inverse resistance increases with increasing magnetic strength but the resistance in the forward direction decreases with increasing magnetic strength although, as apparent from the different steepness of the curves, the decline in forward resistance with increasing magnetic field strength is only slight. When this resistor is used as a rectifier, its rectifying quality is the better the larger the applied magnetic field strength. The characteristics of the magnetic barrier semiconductor are thus generally comparable with those of transistors, with the fundamental exception that due to the magnetic barrier effect the forward and inverse directions are reversible.

An important device according to the invention for shortening the transition interval by means acting upon the semiconductor control circuit is the provision of a feedback coupling for releasing a trigger operation. This will be explained with reference to the embodiment illustrated in Fig. 10. A magnetic barrier semiconductor 2 is connected to the voltage U in series with the load resistor $R_L$ and is located between the poles 3 and 4 of a magnet system 8. The magnetic field for controlling the resistance of member 2 is produced by a winding 5 traversed by a control current $I_V$. A second winding 6 traversed by an electric current $I_S$ acts in opposition to winding 5 to permit weakening the effective control field. The magnet system is further provided with a feedback winding 7 which is traversed by the load current $I_L$ and acts in a cumulative sense relative to winding 6, that is in opposition to winding 5.

When the field strength in the semiconductor 2 is changed in such a sense that an increasing control current reduces the field strength or changes the field strength from a positive value through zero to a negative value, then the resistance of the semiconductor varies in accordance with a flip-flop characteristic. As long as only the positive field strength is effective, the resistance characteristic corresponds to the conditions represented by the right upper quadrant of Fig. 9 and are then, for instance, in accordance with the characteristic $H_2$. When the magnetic field strength in the semiconductor member is reduced by the separate excitation current $I_S$ in winding 6 so as to assume the lower value $H_1$, then the resistance of the semiconductor declines and the current $I_L$ in the load circuit increases. If now this increasing current $I_L$, by virtue of the feedback coupling, is made to act in the same direction as the control current $I_S$, that is at first in the diminishing sense relative to the magnetic field strength, then the load current $I_L$ will increase a further amount. This may cause the field strength to reverse its direction, and the current $I_L$ rises further, up to a limited value dependent upon the external load resistance $R_L$. Thus, a flip-flop phenomenon has occurred.

Figure 11:
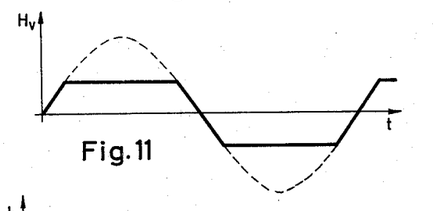

For securing such a feedback effect, it is necessary to have at first a magnetic field of a definite direction act upon the semiconductor. In Fig. 10 this field is produced by the current $I_V$ supplied to the field winding 5, but it may also be produced by permanent magnets (see Figs. 6 and 7). However, if the semiconductor device is to be used for alternating-current circuits in which the direction of the driving voltage periodically reverses, then the control or bias field must likewise reverse at the zero passages of the alternating voltage. This can be done, for instance, with the aid of a magnetic circuit whose excitation winding is energized by the driving alternating voltage but which possesses a magnetic constriction so that by saturation of constriction a magnetization above a given value cannot occur. Instead of such a magnetic constriction, a non-linear resistor may be disposed in the excitation circuit of the magnet system with the effect that a predetermined excitation current is not exceeded. This also permtis producing a trapezoidal dependence of the pre-magnetizing bias field upon the line voltage. In Fig. 11 the pre-magnetizing field strength $H_V$ is shown versus time by the full-line trapezoidal curve. This pre-magnetizing or bias field is produced by the winding 15 in Fig. 10 which for this purpose is excited by alternating current through a current limiting resistor as mentioned above.

The feedback winding 7 (Fig. 10) may also include only part of the magnetic circuit of the field system. Thus, according to the embodiment of Fig. 12, the upper part of the pole shoe 3 of a magnet system otherwise corresponding to Fig. 10, has a recess, and the feedback winding 7 is disposed only on one of the two resulting legs of the pole shoe.

Figure 13:
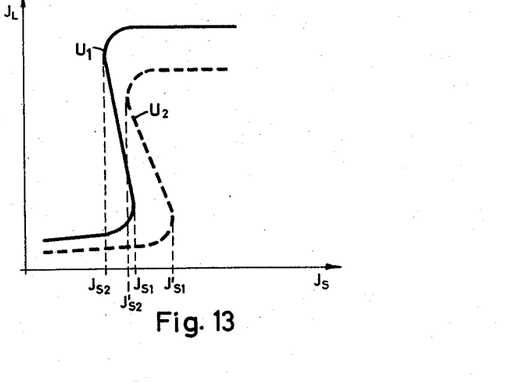

In a feedback connection, for instance according to Fig. 10, the critical value of the controlling magnitude, for instance of current $I_S$, at which a flip-flop phenomenon is triggered is not constant but depends upon the operating voltage U. Fig. 13 illustrates the triggering operation for two different load-circuit voltages $U_1$ and $U_2$. The illustrated curves represent the load current $I_L$ versus the electric control current $I_S$. At the operating voltage $U_1$ the change of resistance from a high to a low value, i. e. from low to high load current, commences at the value $I_{S1}$. At a lower operating voltage $U_2$, a larger control current $I'_{S1}$ is required. The triggering from low to high resistance and hence from high to low load current commences at a somewhat different value of control current, namely at the value $I_{S2}$ with the operating voltage $U_1$, and at the value $I'_{S2}$ with the operating voltage $U_2$. The flip-flop characteristics shown in Fig. 13 are dependent, as to shape and mutual spacing, from the relation of the load resistance to the two limit resistances of the semiconductor and also upon the selected intensity of the feedback effect. Therefore, these operating magnitudes are preferably matched to one another so as to obtain most favorable flip-flop characteristics, for instance a small difference between the values $I_{S1}$ and $I_{S2}$.

Such or similar flip-flop characteristics can be obtained not only with magnetically controllable semiconducting resistors but also with junction-type transistors as are preferably applied for the high power quantities to be controlled in accordance with the invention. With such junction-type transistors, the required control means can be designed in a manner analogous to the above-described means for producing a flip-flop characteristic, particularly by the application of a feedback coupling which is responsive to a transistor-controlled condition of the load circuit.

Figure 14:
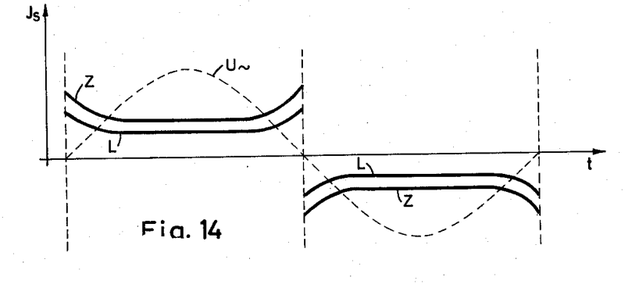

When the operating voltage varies in accordance with a sine wave as is the case with alternating line voltages, then obviously the value of the electric magnitude which triggers the characteristic also varies versus time. This time dependence can be represented by a critical characteristic as indicated at Z in Fig. 14. Since the initiation of the triggering from largest to smallest semi-conductor resistance is comparable with the ignition of an electrode-controlled gas discharge device, this particular characteristic Z is hereinafter called the "ignition curve." The initiation moments for triggering from smallest to largest resistance also result in a characteristic L which in the following is designated as "extinction curve." As mentioned above, the operation with alternating voltage in the load circuit requires a reversal of the controlling currents and also of the pre-magnetizing bias currents at the moments of voltage reversal. Hence, the ignition and extinction curves for the negative half wave of the voltage are mirror-symmetrical to those for the positive half wave, as is also apparent from Fig. 14.

The ignition and extinction curves may become displaced by interfering effects such as changes in temperature. In cases where the resulting errors are appreciable, the disturbing effects upon the control performance can be minimized by compensating means, for instance by connecting temperature-responsive resistors into a feedback circuit.

According to another feature of the invention, the magnetic control circuit or a device coupled therewith is equipped with a rotatable or translatory part for effecting a rapid change of the controlling magnet field from one to another limit value to thereby produce in the semiconductor the desired change of resistance from one to the other limit value or for releasing a trigger operation. The movement may also be controlled by pulses applied at will, or by condition-responsive regulating signals, or feedback magnitudes. Especially advantageous is the application of a rotating movement in apparatus that, in coaction with a rotating machine, require a sequence of repetitive resistance variations. A linear or reciprocating movement for varying the strength of the magnetic control field may be produced, for instance, by a tuning fork or by any other oscillatory mechanical system which is excited, preferably electrically, to secure a single definite frequency of the switching operations. However, such a periodic variation of the magnetic field strength may also be produced by alternating currents of any frequency or involving a superposition of several frequencies.

The above-mentioned requirement for a short transition interval, when applying a magnetic control of the semiconductor resistance members, demands a rapid variation of the controlling magnetic flux. Such a variation can be achieved more easily, that is with smaller wattless power, when the magnetic energy to be built-up and built-down is smaller. The magnetic energy in magnetic circuits is contained in the portions of slight magnetic permeability. It is advisable, therefore, to give the semiconducting resistors traversed by the magnetic flux a minimum in volume. For securing a given useful power capacity with the aid of the smallest feasible semiconductor volume, to this end, cooling of the semiconductor should be provided for. The semiconductor members may be subjected to flowing cooling media and may be provided with cooling plates, fins or cooling channels and the like. It is particularly desirable to give the semiconductor members such a shape as to secure with minimum volume a large heat dissipating surface. To this end the resistors are preferably shaped as thin plates or rods. These plates or rods are interconnected in parallel or in series to form a semiconductor resistance unit whose total resistance value is adapted by the parallel or series connection to the requirement of the particular load circuit. Such plates or rods can be mounted so that they are traversed by one and the same flux and that, despite the large surface of some of the individual parts, relatively small amounts of magnetic flux are sufficient.

Thus in the embodiment shown in Fig. 26, to be further described in a later place, a load circuit according to Fig. 4g includes the semiconductor member 2 of a magnetically controlled device according to Fig. 10, and the member 2 is subdivided into a number of individual crystals 2a, 2b (only two are shown) and comprises cooling fins 2c. The fins consist of magnetizable bodies, for instance of ferrite material, whose magnetic permeability is larger than unity. As a result, the plates or fins not only provide for good cooling, but they also reduce in the magnetic circuit the volume of low permeability thus shortening the time constant of the magnetic control.

Aside from the reduction of the transition losses during switching operations, it is also of advantage to keep the steady-state losses of the semiconductor members in the closed or open condition of the load circuit at a low value. For this purpose, the semiconductor member is preferably so rated that the load resistance is approximately the geometric average value of the two limit resistances of the semiconductor. With periodic switching operations where either the closing period of the opening period is always preponderant the load resistor is preferably made larger than the geometric average of the semiconductor limit resistances, so that the load resistance is equal to the sum of that median value plus a value corresponding to the square root of the ratio of closing period to opening period. In this manner, the average losses occurring with a given periodic switching operation are reduced to a minimum. This likewise contributes to achieving the object of using controllable semiconductors for larger power values than heretofore applicable.

By virtue of the above-described means and performance, the invention provides for purposes of electric power engineering a novel circuit component for switching operations which is eminently suitable to simplify and improve the solution of problems which heretofore called for the use of mechanically moving contacts or vacuum and gaseous discharge devices and thus had to cope with the various disadvantages of such devices. Contacts are always subject to deterioration by migration of material and excessive wear and are often a source of high-frequency interference. They are sensitive to dust, humidity and other atmospheric influence and cannot be as readily and accurately actuated as desirable for many applications. Vacuum tubes for large power requirements are mechanically and electrically sensitive and expensive and in most cases have only a short time of useful life. Gaseous discharge tubes involve the further limitation that they can be extinguished only when the anode current passes to the zero value.

The novel power-current switching devices according to the invention can be used with advantage for the simplest as well as for the most complicated switching requirements regardless of whether simply making or breaking of a load circuit at will is involved or whether periodic switching requirements must be met such as occurring in rectifiers or inverters. For non-periodic switching there is also the advantage that the release of a switching operation by predetermined control magnitudes can be effected in a particularly simple manner. Thus for instance, the conventional current or voltage relays, photoelectric relays, temperature relays and the like condition-responsive devices can be substituted by the novel semiconductor switching devices.

Figure 15:
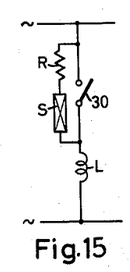
Figs. 15 and 16 show respective circuits of devices for facilitating the switching of reactive loads in high-voltage lines.
Figure 16:
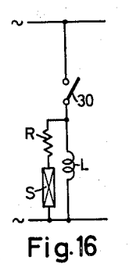

High-power switches according to the invention may be used as auxiliary devices for facilitating the switching of large inductivities or capacitances, for instance in high-voltage circuits. Embodiments of this type are shown in Figs. 15 and 16. In these schematic illustrations the devices for producing flip-flop operation in the semiconductor switching members S are not illustrated because they are in accordance with those described in the foregoing.

According to Fig. 15 a mechanical switch 30 serves for disconnecting the inductivity L energized by alternating voltage. As known, such a switching operation may involve excessive voltages endangering the switch 30 or also the inductivity. When switch 30 is being opened and the voltage across the switch tends to rise above a given value, the switching member S, due to its flip-flop characteristic, opens the circuit and, together with the ohmic series resistor R, dissipates the energy otherwise causing the occurrence of excessive voltage. As soon as the energy is dissipated, the switching member S automatically blocks the circuit thus disconnecting the inductivity L. The switching member S therefore operates, in combination with the series resistor R, in a manner similar to that of the known cathode-drop arresters or other voltage-responsive protective resistors.

The circuit according to Fig. 16 functions in the same manner except that the shunting of the disconnect switch 30 is avoided. The semiconductor switching member S and the series connected damping resistor R are connected in parallel relation to the inductivity L to be disconnected. In this case, the inductivity L is discharged through a short circuit connection extending through S and R, and this short-circuit is closed by virtue of the occurring flop-flop operation until the inductivity L is discharged.

Another important field of application for semiconductor switching members according to the invention is for starting and regulating the operation of electric machines.

Figure 17A:
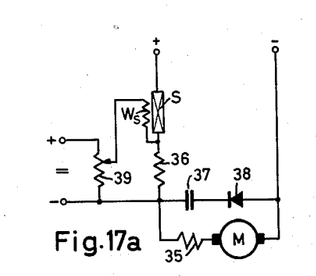
Fig. 17a is the circuit diagram of a motor starting apparatus according to the invention, and the diagram of Fig. 17b is explanatory of its operation.
Figure 17B:
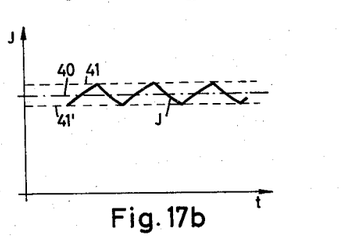

Fig. 17a illustrates schematically a starting device for a direct-current motor M with a series field winding 35. The motor is connected to voltage through a resistor 36 in series with a semiconductor switching member S. In analogy to Fig. 4g, the series connection of a valve 38 and a capacitor 37 may be shunt connected to the motor M and its series field winding 35 as shown. The switching member S is either a magnetically controllable semiconductor of high carrier mobility or a magnetic-barrier semiconductor having flip-flop characteristic as previously explained. The control windings $W_S$ of the semiconductor device is connected to the difference of the voltages across the resistor 36 and across a tapped-off portion of a control potentiometer energized from a source of constant direct voltage. The control is such that the semiconductor resistance of member S trips to its high resistance when the motor current exceeds a given datum value adjusted by means of the potentiometer 39, and trips back to a low value when the motor current drops below a lower limit. As a result, the current is regulated in increments similar to the regulation produced by a Tirill regulator and as exemplified by the diagram of Fig. 17b. In the diagram, the curve I indicates the motor current versus time t. The line 40 represents the datum value set by the potentiometer 39 of Fig. 17a, and the two lines 41 and 41' represent the two current limit values at which the flip-flop operation is triggered. Consequently, the current I has an average value corresponding to the datum value 40. A circuit of the type shown in Fig. 17a therefore is suitable for current limitation during starting and also for regulating the operating current and torque of the motor.

A Tirill-type voltage regulation may also be obtained. To this end the switching member S, is connected parallel to a resistor in the circuit of a shunt-excited or separately excited field winding in the manner known for Tirill regulators. In such circuits, the control winding $W_S$ is excited from the difference between a datum voltage and the actual voltage.

Figure 18:
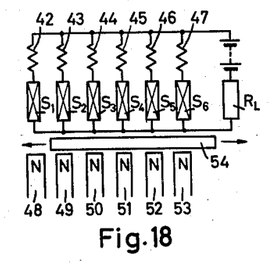
Figs. 18 and 19 are different circuit diagrams exemplifying the invention as applied to a step-type or collector-type control switch.
Figure 19:
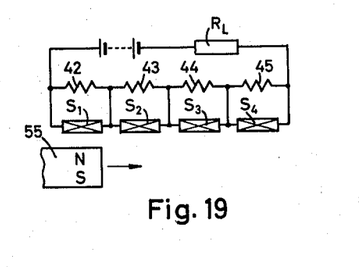
Figure 20:
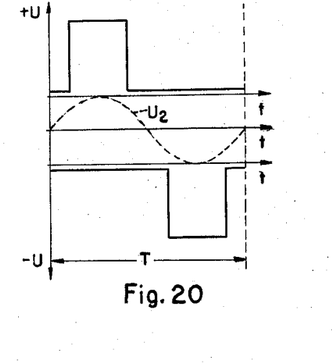
Figs. 20 and 21 are coordinate diagrams explanatory of the operation of such and other periodic switching apparatus.
Figure 21:
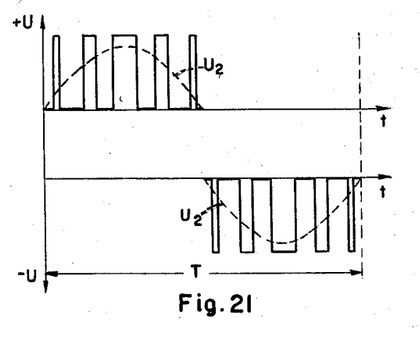

Control and regulating systems are often equipped with collector-type switches for the performance of incrementally adjusting a controlling magnitude in finely graduated steps. This often entails the trouble that, due to soiling of the contact brushes, the contact resistance between the brushes and the segments or other movable contacts of the switch is variable and causes regulating and controlling errors. Such trouble can be obviated by using semi-conductor switching members according to the invention and substituting them for the individual collector segments or contacts and the brushes of the switch. Embodiments of this type are schematically illustrated in Figs. 18 and 19. It is assumed that the switching member $S_1$, etc. shown in these illustrations are provided with the above-described means for obtaining flip-flop characteristic. The purpose of the apparatus according to these illustrations is to apply to a load resistor $R_L$ an adjustable and finely graduated voltage. This is done with the aid of correspondingly graduated group of resistors 42 to 47 which are switched on and off by means of respective series-connected semiconductor members $S_1$ to $S_6$. The semiconductor members are located in the field of respective magnets of which only the pole shoes 48 to 53 are illustrated. Each individual magnetic circuit has an air gap which can be bridged by displacement of a magnetizable control structure 54. As long as the air gap is open, the switching members $S_1$ to $S_6$ have minimum resistance and are traversed by current. When bridging the air gap by the control structure 54, the resistance value of each affected switching member trips to the maximum value so that the member becomes virtually non-conductive. In this manner the resistors 42 to 47 are sequentially connected in parallel relation to each other by progressive displacement of the control structure 54 thus securing the desired graduated voltage adjustment.

In the modification shown in Fig. 19 the resistors 42 to 45 are connected in series and are bridged by the respective switching members $S_1$ to $S_4$. The control of the switching members is effected by means of a single permanent magnet 55. During displacement of magnet 55 in a given direction, the individual magnetic circuits (not further illustrated) of the respective switching members $S_1$ to $S_4$ are so excited that these members are tripped to change their resistance from maximum to minimum or vice versa. In embodiments according to Figs. 18 and 19 the arrangement can be given circular shape so that the apparatus has a design and appearance similar to that of a rotary rheostat. The graduation may include coarse and fine steps as known for control rheostats for special purposes so that relatively few resistors and switching members with a fine subdivision of the total resistance into a large number of steps is achieved.

When using magnetic-barrier semiconductors as switching members S, the individual semiconductor members S may be disposed in a magnetic field which prevents the flow of current through the semiconductor; and this blocking effect can be eliminated by illumination or irradiation of the semiconductor, thus utilizing the radiation-sensitivity of this type of semiconductor device. In such cases it is also preferable to provide for flip-flop characteristic so that the controlling radiation supplies only the trigger signal. Such a design of apparatus according to Figs. 18 and 19 is of advantage, for instance, when it is desired to control a displacement such as the rotation of a pointer or mirror without reaction upon the controlling system. Such apparatus, including a plurality of switching members S are not only suitable for the above-described switching of resistances but may also be used for the switching of any other circuits. For instance, they can be employed as a selector device operating, like a rotary selector for automatic exchanges in communication systems, to open and close selected circuit connections. For illustration of an embodiment of such apparatus, reference is made to Fig. 18. The selector apparatus is similar, except that the magnetic control structure is given such a size that it closes at a time the air gap of only one magnetic circuit of the respective switching member $S_1$ to $S_6$. The resistors 42 to 47 in this case represent the individual circuits with which a selective connection is to be established. Such selector apparatus is of advantage for use in especially sensitive systems in which the sources of trouble inherent in the operation of mechanical contact switches are to be avoided. By delaying the flip-flop operation for a time interval at least equal to the time during which the magnetic control member passes by the individual steps, an undesired switching of intermediate steps is prevented in a simple manner.

The fundamental design shown in Fig. 18 or 19 for making or breaking a load circuit by means of a controllable semiconductor device with a flip-flop characteristic is also of advantage for individual switching operations, for instance when the circuit is to be closed or opened for disconnecting or reversing a drive in dependence upon the position of structure. An example of such operation is the control of the feed drives for the sliders of a machine tool by limit switches. In such cases, too, the flip-flop operation may be triggered by radiation. This affords a remote but direct control of a switching operations without mechanical or electrical connections and without the aid of the conventional control by photo-electric cells.

With the aid of power-current switching members embodying semiconductors in accordance with the invention, it is further possible to substitute the commutator in electric machines for thus eliminating the known disadvantages of such commutators. An embodiment of this type is shown in Figs. 22a to 24. These figures illustrate a direct-current motor or generator operating without a collector. Contrary to the conventional designs, the machine is preferably so organized that the stator forms the armature, in similarity to the construction of synchronous machines. The armature 96 in Fig. 22a has conductor slots 97 of which only a few are schematically indicated. These slots contain the armature winding. The rotatable pole wheel 98 may be formed by a permanent magnet or it may be excited by a separate winding 99 which is energized through slip rings (not illustrated). Fig. 23 represents one of the stator windings located in the slots 97 and shows in a simplified manner a single turn 100 whose two ends are connected to the positive and negative terminal of the machine through pairs of semiconductor switching members $S_1$, $S_2$ and $S_3$, $S_4$. The semiconductor members are of the magnetically-controllable type, namely those of the magnetic barrier type or semiconductor members of high carrier mobility as described above. This permits controlling the semiconductors without mechanical contacts by means of a magnet system which rotates together with the machine. As known, the induced E. M. F. in the individual generator windings of the machine has a time curve extending within two pole divisions, that is, from zero electrical degrees to $2\pi$, according to the diagram of Fig. 24. That is, the E. M. F. is alternating and has a trapezoidal curve shape so that the windings must be continuously reversed in polarity. Consequently, for connecting the winding, for instance during the negative half wave shown in Fig. 24, to the machine terminals with the correct polarity, the switching members $S_1$ and $S_3$ in Fig. 23 must open the current passage while the switching members $S_2$ and $S_4$ must be blocking at that time. When using magnetic-barrier semiconductors the just-mentioned operation can be secured in accordance with Fig. 24 by reversing the controlling flux $\phi_S$ for switching members $S_1$ and $S_3$ in the pole wheel position $\alpha_1$, and restoring the original polarity in the pole wheel position $\alpha_2$, the magnetic control flux being so directed relative to the switching members that it produces blocking effect in these members when it is outside of the pole wheel positions between $\alpha_1$ to $\alpha_2$. In the pole wheel position $\alpha_1$ to $\alpha_2$, the E. M. F. of the winding exceeds the terminal voltage U so that current can be generated only within this range. Hence, the switching members $S_1$ and $S_3$ must be conductive only within this pole wheel range.

Figure 22A:
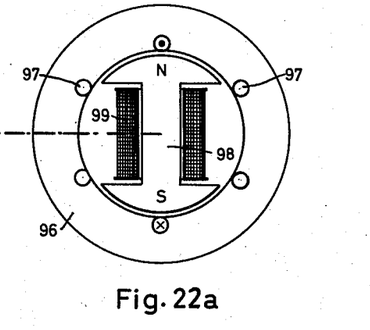
Figs. 22a and 22b illustrate a dynamoelectric machine in which the invention is used for eliminating the conventional commutator.
Figure 22B:
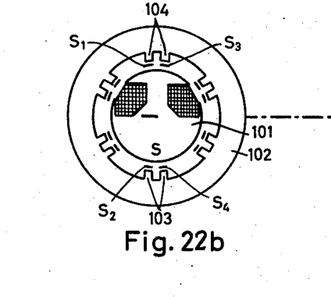
Figure 23:
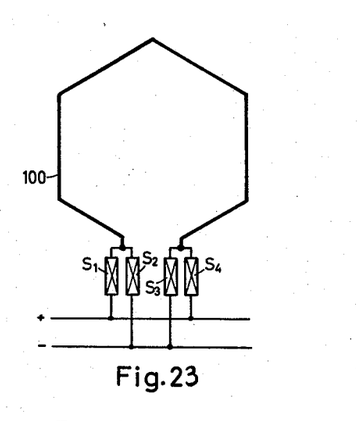
Fig. 23 shows a circuit detail of the same machine and Fig. 24 is a pertaining explanatory diagram.
Figure 24:
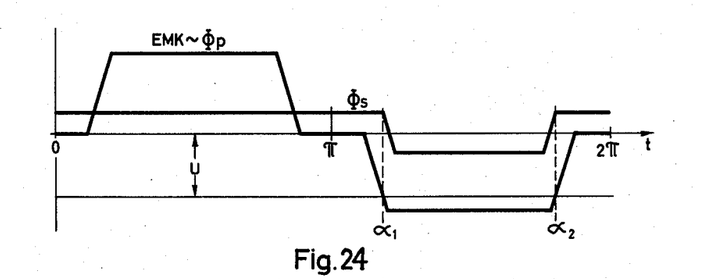

The just-mentioned control of the switching members in dependence upon the pole wheel position can be obtained by coupling with the pole-wheel shaft a control device according to Fig. 22b. This device comprises a magnet 101 which rotates together with the pole wheel and consists either of a permanent magnet or of an electromagnet energized through slip rings. The magnet 101 is surrounded by a stationary yoke structure 102 which is provided with pole pairs 103, 104 corresponding in number to the number of stator phases. Located below these pole pairs are the switching members correlated to the individual winding ends. The correlation between such that the simultaneously and similarly controlled switching members $S_1$ and $S_3$ are assigned to one pole, and the switching members $S_2$ and $S_4$ are assigned to the other pole of the individual pole pair, as is entered in Fig. 22b for the pole pairs 103 and 104. In Fig. 22b, the switching members $S_1$, $S_3$ and $S_2$, $S_4$ are illustrated beside one another. Actually, they are preferably arranged one behind the other in the axial direction so that the control effect imposed upon them will reverse simultaneously in both semiconductor members of each pair. Corresponding to the relative small range $\alpha_1$ to $\alpha_2$ in Fig. 24, as compared with a double pole division 0 to $2\pi$, the two poles of the rotating magnetic structure 101 are given respectively different pole widths. The difference is such that, corresponding to Fig. 24, in the angular position $\alpha_1$ in which the E. M. F. of the individual windings to be reversed in polarity exceeds the terminal voltage, an abrupt reversal of the magnetic flux direction in the correlated magnetic barrier semiconductor members $S_1$, $S_3$ is effected so that these members connect the winding with the correct polarity to the terminals. In the angular position $\alpha_2$, in which the induced E. M. F. again declines below the terminal voltage U, the reverse effect will then suddenly occur so that the switching members again resume blocking action. In such apparatus, it is advantageous to reduce the transition losses in the switching members during the switching operation by providing for trigger or flip-flop characteristics, for instance with the aid of a feedback coupling, as described above.

If the switching members comprise magnetically controllable semiconductors of high carrier mobility without magnetic barrier layer so that the application of a sufficient magnetic field produces blocking action in both directions while without the field the semiconductor members are conducting in both directions, then the same polarity-reversing control device can be used in principle. It is then merely necessary to take care that the controlling magnetic flux, contrary to the conditions represented in Fig. 24, does not vary between a negative and a positive value but varies between zero and a maximum. The magnetic-circuit structures 100 and 102 are then to be given a corresponding somewhat modified shape.

Figure 25:
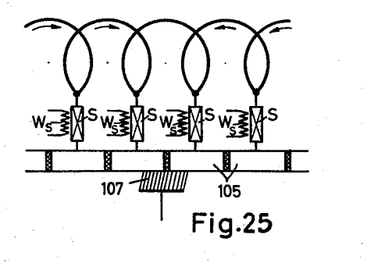
Fig. 25 shows schematically a device according to the invention for facilitating commutation in a collector-type machine.

However, semiconductor switching devices according to the invention may also be used merely as a commutation-facilitating auxiliary to commutators, collectors and step-control switches in which no interruption of the circuit occurs when passing from one step or segment to the other. This will be explained with reference to the embodiment schematically illustrated in Fig. 25 representing a portion of a commutator machine in developed form. The commutator segments 105 are connected with the turns of the armature winding 106 and cooperate with a contact brush 107. Interposed between the individual segments 105 and the correlated parts of the machine winding 106 are respective semiconductor switching members S. These switching members are preferably given a flip-flop characteristic as described, and they are so controlled that the resistance of each member is large with small currents flowing through the segment but is triggered down to a low value when a given current magnitude is exceeded, and vice versa. The control of the switching members S, regardless of whether semiconductors of high carrier mobility or magnetic-barrier semiconductors are used, can be effected magnetically, as is indicated in Fig. 25 by the control windings $W_S$. When the brushes 107 of the commutator run onto and off the individual sectors, the sector current is interrupted not by the edge of the brush but rather by the series-connected switching member so that detrimental arcing at the brushes is eliminated. The same arrangement is applicable to step-control switches. For instance, when such a switch serves for connecting various types of a transformer into a circuit, then the transformer winding is connected with the step switch device in the same manner as the winding 106 shown in Fig. 25.

There are other ways than shown in Fig. 25 for applying the invention for commutating purposes. According to one of these, several collectors or commutators are provided, such as a main collector and an auxiliary collector, and the semiconductor members are connected only in the supply leads of the auxiliary collector whose brush has a larger width than that of the main collector. Another way is to connect controllable semiconductor switching members into the supply leads of the brushes for the auxiliary collector in order to prevent sparking when the brush runs onto and off the segments of the auxiliary collector.

As mentioned above and exemplified by Fig. 17a, the control circuit of the power switching semiconductor device can be operated with a variable control magnitude responsive to a variable condition. According to another feature of the invention, this variable control magnitude is supplied through another semiconductor switching device designed and operating in accordance with the same principles as explained in the foregoing. This will be understood from the embodiment illustrated in Fig. 26.

Figure 26:
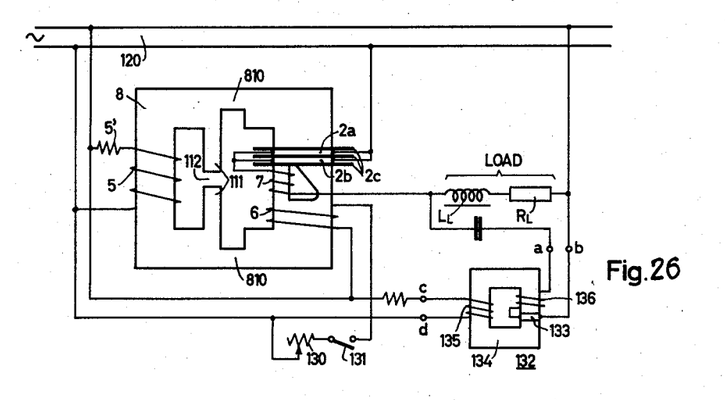
Fig. 26 shows a current control system and Fig. 27 a modified detail of such a system.

Fig. 26 shows a control and regulating system for energizing a load $R_L$ from an alternating-current line 120 by controllable voltage. As described in an earlier place of this specification, the load circuit of Fig. 26 corresponds to that of Fig. 4g, and the semiconductor device for switching the load circuit is essentially similar to that already described with reference to Fig. 12.

The control field winding 6 of magnet 8 is energized from the alternating current line 120 through a control rheostat 130 in series with a switch 131. Rheostat 130 permits adjusting the instantaneous voltage at which within each half-wave the flip-flop operation is to be initiated. Thus the setting of rheostat 130 determines the phase angle of the make moment. Switch 131 when opened renders the device inactive, i. e. interrupts the flow of alternating current through the load circuit. If the resistance of rheostat 130 is made sufficiently small, then virtually the entire alternating current will flow through the load. In other words, the flip-flop operation is then triggered at the beginning of each half-wave, provided the switch 131 is closed.

The bias field winding 5 of the control magnet 8 is energized from the alternating current line 120, if desired, through the illustrated resistor 5' which reduces the time constant of winding 5.

As described above, the iron body 8 of the magnet system has restricted portions at 810 which limit the premagnetization in accordance with Fig. 11. Once the restricted passages 810 in the magnetic circuit are saturated, the magnetic flux produced by the winding 5 flows through the magnetic shunt path 111 which includes an air gap 112.

The valve device V in the embodiment of Fig. 26 corresponds to that shown in Fig. 4h, and is denoted in Fig. 31 by 132. This valve device reverses its forward direction in synchronism with the alternating line voltage. It comprises a controllable semiconductor member 133 which is located in the field gap of a magnet 134. The magnet is energized from the alternating current line by a winding 135 and is also equipped with a feedback winding 136 connected in series with the semiconductor member 133.

Figure 27:
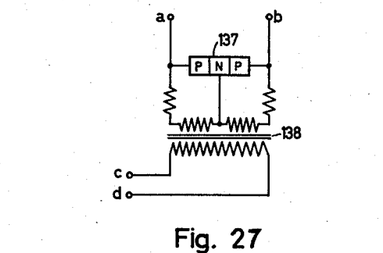

Instead of a reversible valve device of the type shown in Fig. 26, the device 132 may also be substituted by a junction-type transistor which is likewise controlled by the alternating voltage so as to have rectifying action of alternating direction of conductance. The device according to Fig. 27 is to be connected to the terminals a, b and c, d in Fig. 26. A p-n-p transistor 137 is connected across the terminals a and b. Connected parallel to the transistor member is a transformer 138 with two secondary windings. This transformer has its primary winding energized from the line terminals c and d. The transformer operates to make the n-portion of the transistor positive relative to the terminal a during one half-wave, and relative to the terminal b during the other half-wave. As a result, the transistor becomes conductive in alternating directions in successive half-waves, respectively.

The above-described examples show that outstanding advantages are obtainable by using semiconductor switching devices according to the invention for the solution of various switching problems in the generation, distribution and consumption of electric power of the high magnitudes used in utility systems and other branches of power engineering. However, the possibilities of application and the specific embodiments herein described are not exhaustive, as devices according to the invention can be used as a switching component in power circuits in many other cases where heretofore the solution of a particular switching problem had to rely upon mechanical or electronic switching or where the invention otherwise affords a simplification or improvement akin to the advantages above mentioned. It will further be understood that, while the above-described means for reducing the transition losses during the switching operation are particularly advantageous and are needed or desirable for power control, there are various other problems that can be satisfied by a semiconductor switching device according to the invention without the aid of such loss reducing means. This is the case, for instance, when the invention offers the above-described advantages and novel performance relative to control regulating or translating purposes, but where the power to be controlled by the semiconductor is sufficiently small to permit relying upon the natural dissipation of transition losses in the semiconducting components.

We claim:

1. Apparatus for making and breaking power circuits without switch contacts, comprising a load circuit, switching means connected in said load circuit and comprising a controllable semiconductor member having a maximum-limit to minimum-limit resistance ratio of at least 10:1, control means operatively joined with said member for controlling it to change its resistance between said limits within a given transition interval, and means for reducing the power loss in said member during said interval.

2. Apparatus for making and breaking power circuits without switch contacts, comprising a load circuit, a switching device having a magnetic-barrier semiconductor member serially connected in said load circuit and having a maximum-limit to minimum-limit resistance ratio of at least 10:1, control means for controlling said member to change its resistance between said limits within a given transition period, said control means comprising a magnetic field system having a field in which said member is located, and means for reducing the power loss in said member during said interval.

3. Power-circuit switching apparatus, comprising a load circuit, a switching device having a semiconductor member serially connected in said circuit and having control means responsive to a control magnitude for varying the resistance of said member between maximum and minimum limits within a switching interval, said two limits of said member having a ratio of at least 10:1, said control means comprisng a magnet system having a magnetic field in which said semiconductor member is located and a control circuit inductively linked with said system for varying said field during said interval, and means for reducing the power loss in said member during said interval.

4. Apparatus for making and breaking power circuits without switch contacts, comprising a load circuit, switching means connected in said load circuit and comprising a controllable semiconductor member having a minimum carrier mobility of about 10,000 cm.$^2$/volt second and having a maximum-limit to minimum-limit resistance ratio of at least 10:1, control means operatively joined with said member for controlling it to change its resistance between said limits within a given transition interval, and means for reducing the power loss in said member during said interval.

5. Switching apparatus for power circuits, comprising a load circuit to be controlled, a switching device having a controllable semiconductor member connected in series with said load circuit, said member having a maximum resistance limit and a minimum resistance limit of a ratio of at least 10:1, said switching device having control means for changing the resistance of said member between said limits within a transition interval, and condition-responsive control means connected with said circuit for changing the load resistance during said transition interval for reducing the power loss in said member.

6. In switching apparatus according to claim 5, said condition-responsive control means comprising a controllable semiconductor connected with said semiconductor member of said switching device for controlling said device.

7. Switching apparatus for power circuits, comprising a load circuit to be controlled, a switching device having a controllable semiconductor member connected in series with said load circuit, said member having a maximum resistance limit and a minimum resistance limit of a ratio of at least 10:1, said switching device having control means for changing the resistance of said member between said limits within a transition interval, and static impedance means connected with said load circuit for reducing the power loss in said member during said interval.

8. In switching apparatus according to claim 7, said static impedance means comprising a combination of reactive and asymmetrically conductive circuit components, and said load circuit having an ohmic-inductive characteristic during make operation of said device and ohmic-capacitive characteristic during break operation.

9. In switching apparatus according to claim 1, said circuit having ohmic load means, and said power-loss reducing means comprising an inductance means in series with said load, and a capacitor and an asymmetrical conductor connected in series with each other across at least one of said load and inductance means respectively.

10. In switching apparatus according to claim 1, said circuit having a predominantly inductive load means, and said power-loss reducing means comprising a capacitor and an asymmetrical conductor connected in series with each other across at least one of said semiconductor member and load means respectively.

11. Power-circuit switching apparatus, comprising a load circuit, a switching device having a semiconductor member serially connected in said circuit and having control means responsive to a control magnitude for varying the resistance of said member between maximum and minimum limits within a switching interval, said two limits of said member having a ratio of at least 10:1, and a feedback coupling between said load circuit and said control means and responsive to resistance variation of said semiconductor member, said feedback coupling having relative to said control means the poling required for increasing the rate of change of said control magnitude, whereby said interval is shortened to reduce the power loss in said member during said interval.

12. Power-circuit switching apparatus, comprising a load circuit, a switching device having a semiconductor member serially connected in said circuit and having control means responsive to a control magnitude for varying the resistance of said member between maximum and minimum limits within a switching interval, said two limits of said member having a ratio of at least 10:1, said control means comprising a magnet system having a magnetic field in which said semiconductor member is located, a feedback winding on said magnet system and connected with said load circuit for response to resistance variation of said member, said feedback winding having relative to said magnet system the poling required for increasing the rate of change of said control magnitude, whereby said interval is shortened to reduce the power loss in said member during said interval.

13. Power-circuit switching apparatus, comprising a load circuit, a switching device having a semiconductor member serially connected in said circuit and having control means responsive to a control magnitude for varying the resistance of said member between maximum and minimum limits within a switching interval, said two limits of said member having a ratio of at least 10:1, said control means comprising a magnet system having a magnetic field in which said semiconductor member is located, a control winding on said field system for exciting it in accordance with said magnitude, a control circuit connected to said control winding and having condition-responsive sensing means for varying said magnitude, a feedback winding on said magnet system and connected with said load circuit for response to resistance variation of said member, said feedback winding having relative to said control winding the poling required for increasing the rate of change of said control magnitude, whereby said interval is shortened to reduce the power loss in said member during said interval.

14. Power-circuit switching apparatus, comprising a load circuit, a switching device having a semiconductor member serially connected in said circuit and having control means responsive to a control magnitude for varying the resistance of said member between maximum and minimum limits within a switching interval, said two limits of said member having a ratio of at least 10:1, and a feedback coupling between said load circuit and said control means and responsive to resistance variation of said semiconductor member, said semiconductor having together with said control means and said feedback coupling a flip-flop resistance characteristic so that a given variation of said control magnitude causes tripping of said resistance from one to the other resistance limit.

15. In apparatus according to claim 1, said controllable semiconductor member comprising a plurality of semiconductor plates electrically interconnected to provide the resultant current-carrying capacity required in said load circuit, said plates being thin in comparison with their conductive length for enlarging the heat-dissipating surface of the semiconductor member.

16. In apparatus according to claim 3, said member comprising a number of semiconductor bodies of flat shape electrically interconnected to provide the resultant current carrying capacity required in said load circuit, and heat-dissipating parts interposed between said bodies and having a magnetic permeability greater than unity, whereby the volume of slight permeability located within said magnetic field is reduced to obtain a shortened time constant of the magnetic control action.

17. Power-circuit switching apparatus, comprising a load circuit, a switching device having a semiconductor member serially connected in said circuit and having control means responsive to a control magnitude for varying the resistance of said member between maximum and minimum limits within a switching interval, said two limits of said member having a ratio of at least 10:1, said control means comprising a magnet system having a magnetic field in which said semiconductor member is located, a control circuit inductively linked with said magnet system for applying thereto a magnetomotive force variable in accordance with said magnitude, said magnet system having a saturable portion whereby the interval of change in magnetic flux in said system is shorter than the interval of change in said magnetomotive force.

18. In apparatus according to claim 3, said magnetic field system comprising a magnetic circuit having a movable structure for rapidly varying said field.

19. Apparatus according to claim 1, comprising a plurality of said switching means having said respective semiconductor members connected in said load circuit for jointly switching said load circuit, said switching means having respective control means for changing the resistance of said semiconductor members, said semiconductor members having different resistance values graduated against each other, and said control means having sequential operation whereby said switching means are controlled to progressively change the resistance in said circuit so that each of said members switches less than the total power to be controlled and said resistance ratio of the totality of said members is larger than that of the individual members.

20. Power-circuit switching apparatus, comprising a load circuit, a switching device having a semiconductor member serially connected in said circuit and having control means responsive to a control magnitude for varying the resistance of said member between maximum and minimum limits within a switching interval, said two limits of said member having a ratio of at least 10:1, increasing the rate of change of said control magnitude, and a feedback coupling between said load circuit and said control means and responsive to resistance variation of said semiconductor member, said semiconductor having together with said control means and said feedback coupling a flip-flop resistance characteristic so that a given variation of said control magnitude causes tripping of said resistance from one to the other resistance limit, and said control means having a current-responsive member connected with said load circuit for tripping said resistance in response to overload.

21. Switching apparatus, comprising a power circuit having a reactive load means, main switch means connected in series with said load, a damping circuit connected parallel to one of said means for facilitating the switching of said reactive load means by said main switching means, said damping circuit having an auxiliary switching device comprising a semiconductor member serially connected in said damping circuit and having control means for varying the resistance of said semiconductor member, said semiconductor member when controlled by said control means having a resistance variation of at least 10:1.

22. In apparatus according to claim 14, said load circuit comprising a motor, and said control means being connected to said load circuit and responsive to the current in said motor, whereby said motor is controlled to draw regulated current when starting.

23. Switching apparatus for power circuits, comprising a load circuit, a switching device having a plurality of controlled semiconductor members connected in series with said load circuit, each of said members having a maximum to minimum resistance ratio of at least 10:1, and said members having a common control means for sequentially controlling them to vary their resistance between the limit values.

24. In switching apparatus according to claim 23, said control means comprising a displaceable structure, and said members having respective magnetic circuits sequentially controllable by said structure.

25. Apparatus according to claim 14, comprising alternating-current supply means connected to said load circuit, said control magnitude being variable in synchronism with the alternating voltage of said supply means and controllable to cause said semiconductor member to pass current from said supply means through said load circuit for a controlled conductance interval forming a selected part of the current half-wave of said supply means.

26. In apparatus according to claim 25, said conductance interval having a point of termination preceding the zero passage of said half-wave.

27. Apparatus according to claim 25, wherein said semiconductor member is controlled to pass rectified current through said load circuit, said load circuit having a load essentially consisting of inductive smoothing means, and said switching device having continuously displaceable make and break moments for varying the wattless power consumption of the apparatus between an inductive and a capacitive value.

28. Apparatus according to claim 25, wherein said semiconductor member is controlled to pass rectified current through said load circuit, said load circuit being short-circuited, wave filter means connected with said alternating-current supply means for eliminating upper harmonics caused by the short-circuit, and said switching device having continuously displaceable make and break moments for varying the wattless power consumption of the apparatus between an inductive and a capacitive value.

29. The combination of a plurality of switching apparatus according to claim 1 with a dynamo-electric machine for commutating the armature current of said machine, said machine comprising terminals and a rotatable armature winding, said semiconductor members of said respective switching devices being connected between said terminals and said winding, and a magnet-field device rotatable together with said armature winding and forming part of said control means of all said switching devices for cyclically controlling said semiconductor members to vary their resistance between said resistance limits.

No references cited.